United States Patent [19]

Plochman

[11] Patent Number: 5,208,055

[45] Date of Patent: * May 4, 1993

[54] FREEZE DRIED CHEESE AND POPCORN PRODUCT

[75] Inventor: Frederic W. Plochman, Hinsdale, Ill.

[73] Assignee: NatureStar Foods, Inc., Hinsdale, Ill.

[ * ] Notice: The portion of the term of this patent subsequent to Jun. 11, 2008 has been disclaimed.

[21] Appl. No.: 821,438

[22] Filed: Jan. 15, 1992

[51] Int. Cl.$^5$ ............................................. A23B 9/10
[52] U.S. Cl. ..................................... 426/93; 426/307; 426/384; 426/385; 426/443; 426/444; 426/582; 426/625; 426/808
[58] Field of Search ................... 426/89, 93, 307, 384, 426/385, 443, 444, 625, 808, 582

[56] References Cited

U.S. PATENT DOCUMENTS

| | | | |
|---|---|---|---|
| 2,181,109 | 11/1939 | Dodge | 426/93 |
| 2,292,447 | 8/1942 | Irwin | 34/5 |
| 3,294,039 | 12/1966 | Ogden | 426/307 |
| 3,573,932 | 4/1971 | Laskin | 426/101 |
| 4,569,847 | 2/1986 | Andrews | 426/94 |
| 4,759,937 | 7/1988 | Spector | 426/274 |
| 4,849,233 | 7/1989 | Hemker | 426/93 |
| 5,023,096 | 6/1991 | Plochman | 426/89 |

*Primary Examiner*—Jeanette Hunter
*Assistant Examiner*—Helen F. Pratt
*Attorney, Agent, or Firm*—Roper & Quigg

[57] ABSTRACT

A method for producing an improved food product comprising the steps of providing an unlayered, substantially-homogeneous mixture of previously popped popcorn and shredded cheese; heating the mixture to melt the cheese; cooling the mixture to form a cohesive mixture of cheese and popcorn; freezing the cohesive mixture to form a frozen mixture; and freeze-drying the frozen structure; and the resulting food product.

25 Claims, No Drawings

FREEZE DRIED CHEESE AND POPCORN PRODUCT

BACKGROUND OF THE INVENTION

This invention relates generally to a food product and a method for making such a food product. It is specifically concerned with a snack food that is crunchy, yet made without frying or baking.

In U.S. Pat. No. 5,023,096, the disclosure of which incorporated herein by reference, a food product and a method of making that particular food product were disclosed. As set forth below, the present invention constitutes a marked improvement over such a food product in a number of different ways.

SUMMARY OF THE INVENTION

This invention provides an improved unreconstituted freeze-dried food product which constitutes an unlayered, substantially-homogeneous, freeze-dried mixture which comprises a cohesive mixture of cheese and popped popcorn. This invention also provides an improved process for making such a food product. The food product produced can be prepared relatively easily and inexpensively in a form wherein the resulting product optionally may be broken into small pieces or clusters.

DETAILED DESCRIPTION

While the present invention can be practiced by use of various steps, the preferred process is set forth below. Throughout the specification the food product produced by the method of this invention will sometimes be referred to as popcorn/cheese pieces. It is to be understood, however, that the formation of the product in the form of small pieces or clusters is optional.

It was a long sought goal in the snack food industry to combine effectively the tastes of popped popcorn and cheese. However, it was also known that, under ordinary circumstances, if one simply melted cheese over popped popcorn, the moisture from the melted cheese would degrade the popcorn. As a result, it was believed that popped popcorn and melted cheese were structurally incompatible and could not be combined as such. Consequently, alternative means of combining popped popcorn and cheese were utilized, such as coating popped popcorn with powdered cheese. While powdered cheese did not degrade the popped popcorn, it was felt that the taste of the combination of powdered cheese and popped popcorn did not capture fully the taste and texture that otherwise would be achieved if an effective way was found to combine melted cheese and popped popcorn. One way to combine melted cheese and popped popcorn was discovered and disclosed in U.S. Pat. No. 5,023,096. However, in accordance with the invention disclosed in that patent, it was previously believed that, in order to bond the structurally incompatible foods of popped popcorn and cheese effectively, it was necessary to create a three-layer structure wherein popped popcorn effectively would be "sandwiched" between a substantially uniform base layer of cheese and a subsequently added layer of cheese. As discussed below, the resulting multi-layered structure had several disadvantages relating, for example, to structural integrity, difficulty of manufacture, cost of manufacture, and taste. The disadvantages were found to be attributable to the base layer of cheese then believed to be necessary to make the food product.

Though experimentation with different furnace technologies, different heating times, different furnace temperatures, different freezing techniques, and different combinations of the above, a way was found to bond the structurally incompatible popped popcorn and cheese without resort to the multi-layer approach requiring a base layer of cheese espoused in U.S. Pat. No. 5,023,096, and without the attendant disadvantages.

In preparing the food product of U.S. Pat. No. 5,023,096, it was found that the resulting three-layer structure had several shortcomings. For example, it was found that the base layer of cheese sometimes separated from the other layers of the structure. If the processing steps were not regulated extremely carefully, a non-cohesive, non-bonded combination of freeze-dried cheese and popcorn was obtained. The careful regulation of the process was labor-intensive and resulted in high production costs. Moreover, even when the process was regulated carefully, a certain amount of separation would occur resulting in wasted product and increased costs.

On those occasions when a cohesive structure was obtained successfully, it was found that further processing the structure by breaking the structure into bite-sized pieces created shards or fragments of the bottom layer of cheese. These freeze-dried shards of cheese were, in some cases, sharp and hard and were undesirable.

Furthermore, the resulting three-layered structure required at least two separate heating steps: (1) to form the base layer of cheese, and (2) to bond the top layer of cheese to the popped popcorn and base layers, respectively. This two-step heating process resulted in increased production costs.

Because of these and other problems, a solution was sought. The present invention provides such a solution in the form of a food product to be consumed in its non-reconstituted state comprising an unlayered, substantially homogeneous, cohesive, freeze-dried mixture which is composed of popped popcorn and cheese. There is an improved taste balance in the product of this invention because the popped popcorn taste and texture is not overwhelmed by the multiple-layers of cheese found in previous products; as a result, the new invention fits better with the light foods trend in consumer preference.

The popcorn/cheese pieces of this invention are made by first providing an unlayered, substantially homogeneous mixture of popped popcorn and shredded cheese.

The popped popcorn may be prepopped by any existing technology. Moreover, even a flavored popcorn may be used. However, the popcorn must be of a type that does not char when heated further. It has been found that certain flavored popcorn, as well as popcorn coated with an oil that has a low smoke temperature, will not be acceptable. In one embodiment, popped cheese-powder coated popcorn is used as the popped popcorn.

As used in the specification and claims the term "cheese" is used to refer collectively to cheese, cheese food, cheese spread or other cheese-like products, and is not intended to be limited to products which can be labeled as cheese under federal food labeling guidelines.

Many types of cheese can be used as the shredded cheese. The optimum cheese shred configuration for maximum even distribution across and within the popped popcorn is a long, two to three inch strand of cheese that is substantially flat, being about ⅛ to 3/16" wide, and very thin (about 0.060" in thickness), for quick melting.

In one embodiment, white cheddar cheese is used. Aged cheddar is preferably in a 3½"×3½"×2" pre-cut block form at 37° F. before shredding. This temperature is preferable to ensure that the cheese has a firm enough texture to shred easily without crumbling. This temperature is chosen depending on the density and hardness of the cheese to ensure the necessary firmness. Denser cheeses may be shredded at higher temperatures. If cheddar cheese is used, it has been found that it is preferable to use cheese which is aged about four months for full flavor development.

A preferred way of obtaining the substantially homogeneous mixture is by providing a substantially uniform substrate of popped popcorn and sprinkling or otherwise placing shredded cheese on top of and in the interstices of the popcorn substrate. In one embodiment, the substrate is made from approximately 15 ounces of powdered cheese coated popped popcorn spread over a 27"×30" area such that the thickness of the popped popcorn is about one kernel thick. More or less popped popcorn can be used if desired. The shredded cheese is added on top of and in the interstices of the popped popcorn substrate. In an embodiment where 15 ounces of popped popcorn coated with powdered cheese has been spread over a 27"×30" area, 10 ounces of fresh shredded cheese are spread substantially evenly over the same area. This results in a substantially homogeneous mixture of shredded cheese and popped popcorn.

The substantially homogeneous mixture of popped popcorn and shredded cheese may be formed as noted above; moreover, the process may be repeated by providing additional popped popcorn substrates on top of previously formed substantially homogeneous mixtures of popped popcorn and cheese with additional shredded cheese being disposed on top of and in the interstices of the additional substrate in the manner described above. Using this multiple thickness approach, a thicker resulting food product may be achieved. The additional popped popcorn substrate is laid on top of the earlier-formed substantially homogeneous mixture of popped popcorn and cheese to make a thicker resulting food product. This process can be repeated as many times as desired; however, a two thickness method has been found most preferable. In any event, while multiple thicknesses of popped popcorn substrate may be used, the ultimate result is an unlayered, substantially homogeneous mixture of popped popcorn and shredded cheese.

In the preferred commercial embodiment of the invention, this process of preparing the unlayered, substantially homogeneous mixture of popped popcorn and cheese is accomplished by providing the first popcorn substrate and dispensing the shredded cheese above the popcorn in such a quantity, and using cheese of sufficiently finely shredded nature as described above, so that shreds of cheese rest on top of and in the interstices of the popcorn substrate. The product is made thicker by repeating the process once.

When melted, the cheese acts as the bonding agent which, when "cured" by cooling, holds together the popcorn/cheese pieces as a cohesive mixture. Thus, enough cheese must be used such that, upon melting and subsequent cooling, it forms a cohesive popcorn/cheese mixture with a plurality of kernels of popped popcorn bound to one another by the cheese. However, unlike the three-layer structure disclosed in U.S. Pat. No. 5,023,096, each portion of the resulting structure need not adhere to each and every other portion of the structure; i.e.. unlike the invention described in U.S. Pat. No. 5,023,096, the resulting food product in some embodiments may separate or become somewhat fractured without adversely affecting the final product.

However, an excess of cheese must be avoided. For example, if an excess of cheese is utilized such that the popped popcorn puffs are encapsulated in the melted cheese, the release of moisture by the cheese will shrivel and degrade the popcorn. While experimentation may be desirable to find the ratio of shredded cheese to popped popcorn that is sufficient to bind and add flavor to the structure, the inventors have found currently that a weight ratio of 3 parts popped popcorn to 2 parts cheese yields the best results in the case of white cheddar cheese.

If optional additional ingredients, such as herbs, spices, fruits, nuts, seafood, meats, vegetables, sauces or the like, are desired to be added to the final product, it is advantageous (though not necessary) that they be added at this time. Preferably the additional ingredients will be of such size, or will be reduced to a size (such as by chopping or shredding), that the additional ingredients will fall within the interstices of the popcorn substrate, amongst the cheese strands.

After constructing the unlayered, substantially homogeneous mixture of popped popcorn and cheese, as well as any optional ingredients, the structure is heated until the layer of cheese melts over and in-between the popped popcorn. Any known heating method can be used; however, in the preferred embodiment, the heating is provided by use of an impinger hot air oven at approximately 250° F. The time of heating is critical; the mixture is heated only to the melting point of the cheese. For example, when preparing the popcorn/cheese pieces in a batch operation in a 27"×30" tray using a total of 30 ounces of popcorn and 20 ounces of cheese for the mixture, formed by the two thickness process described above, it is the experience of the inventor that a heating time of 1 minute 50 seconds will sufficiently melt the cheese without resulting in degradation of the final product.

It has been discovered that the use of an impinger oven at the temperature and heating time set forth above results in a heating step which eliminates the previous need for a supporting base layer of cheese as set forth in U.S. Pat. No. 5,023,096. The use of the impinger oven also advantageously eliminates the two-melt operation described in U.S. Pat. No. 5,023,096. The impinger oven is capable of melting the entire product in one pass while allowing the cheese to bind the popcorn kernels to each other, eliminating the necessity for a pre-melting of a base layer for structural integrity.

Moreover, use of the impinger oven diminishes the degrading effect on the popped popcorn from moisture released by the cheese when the cheese melts. The impinger oven with its blowing hot air columns, unlike conventional ovens with radiant heat, minimizes the amount of moisture coming out of the cheese and into direct contact with the popped popcorn, which otherwise would soften and degrade the popped popcorn. The inventor has found that radiant heat tends to drive the moisture of the melting cheese to the popped popcorn. An impinger oven contains columns of hot air blowing down upon the product and up from underneath the product, such as when the product moves through the oven on a conveyor. Thus, it has been found that the hot air quickly circulates through the crevasses of popped popcorn and shredded cheese creating very uniform melting.

Furthermore, by eliminating the bottom layer of cheese, the cheese in the unlayered, substantially homogeneous mixture of popped popcorn and cheese melts so as to conform better to the irregular, somewhat rounded form of the popped popcorn, and adheres more uniformly to the popped popcorn. The uniform nature of the heating provided by the impinger oven has eliminated the need for the multi-layer structure disclosed in U.S. Pat. No. 5,023,096 as well as the attendant disadvantages of that structure detailed above. Moreover, the uniform heating results in less waste because the product produced is more uniformly acceptable. Further, the use of the impinger oven results in labor savings as the heating step does not need to be monitored as closely to obtain acceptable results.

After heating, the mixture is removed from the heat source, and is cooled thereby forming a cohesive popcorn cheese mixture, and is immediately subjected to freezing. In the preferred embodiment, the melted mixture is conveyed into a cryogenic $CO_2$ freeze tunnel at a temperature of $-50°$ F. to $-75°$ F. The timing of the freezing step has been found to be critical. Delay in placing the mixture with the melted cheese in the freezer will result in the popped popcorn absorbing moisture from the melted cheese, with the outcome being a shriveled or degraded popcorn portion of the product. It is preferred that the freezing step begin within about 15 seconds after completion of the melting and, if delayed more than about 45 seconds to 1 minute, significant degradation of the popped popcorn has been found to occur. This freezing step is continued until the entire mixture is frozen completely. In the previously described batch embodiment, the 27"×30" tray is in the cryogenic freeze tunnel for approximately seven minutes, but it appears that freezing may be complete halfway through the tunnel.

Once the structure has been frozen, it is subjected to a freeze-drying process in a vacuum chamber. In the previously described batch embodiment, the 27"×30" tray containing the frozen mixture is placed in the vacuum chamber at 195° F. for 2 hours. Lower temperatures can be used with a corresponding increase in the time of freeze-drying. However, the inventor has discovered that if the freeze-drying step is conducted at 220° F. or above the cheese degrades. The product is freeze-dried, preferably until no more than 3 weight percent moisture remains; more preferably, the product is freeze-dried to below 1 weight percent moisture. This level of moisture is found to achieve the maximum preferred product texture--tender crispness. The freeze-drying technology is applied to vaporize directly the ice crystals under vacuum without defrosting the product, thus protecting the crispness of the popped popcorn from moisture damage and rendering the cheese crisp. The finished product is cooled in a dry environment.

At this point the food product is completely prepared. However, the popcorn/cheese pieces of the present invention can be treated in various ways to change the appearance of the product. One such treatment is to break or otherwise fracture the product further into relatively bite-size pieces which appear somewhat similar in size and shape to pieces of peanut brittle. In such an embodiment it has been found advantageous to use popped powdered cheddar cheese flavored popcorn for the popped popcorn and white cheddar cheese for the cheese. In addition it has been found, especially where the product is to be marketed in its broken-up form, that herbs, spices, fruits, vegetables, nuts, seafood, meats, sauces or the like can be added to the popcorn/cheese pieces for additional appearance and flavor reasons. These can be added in original or freeze-dried form.

When freeze-dried, the final resulting product is hydrophilic; therefore, the product must be packaged in moisture and oxygen resistant packaging for maximum shelf life. Preferably, this is done in an inert atmosphere or in vacuum packing. In one preferred embodiment, the product is packaged in nitrogen flushed foil bags. This has been found to maximize shelf-life and protection from photooxidation. Especially where a cheese which is high in butterfat, such as cheddar cheese, is used as the shredded cheese, it is preferred to use packaging to minimize the effects of photo-oxidation known by the inventor to occur with respect to butterfat and products containing high amounts of butterfat. If moisture is allowed to contact the final product, the product will degrade in a short period of time.

The product is consumed as it is from the package without reconstituting the product by the addition of water or other moisture.

Those skilled in the art will recognize that the above recited steps can be modified easily and that such modifications are within the spirit and scope of the invention. Moreover, those skilled in the art will readily recognize that the heating, freezing, and freeze-drying steps can vary in timing, temperatures and procedures depending on the types and sizes of equipment used.

Having described the invention, what is claimed is:

1. A method for producing a crunchy freeze-dried food product to be consumed in its non-constituted state comprising the steps of:
   providing an unlayered, substantially homogeneous: mixture of popped popcorn and shredded cheese;
   heating said mixture to melt said shredded cheese;
   cooling said heated mixture thereby forming a cohesive mixture of cheese and popped popcorn;
   freezing said cohesive mixture to form a frozen mixture; and
   freeze-drying said frozen mixture to provide a crunchy freeze-dried food product to be consumed in its non-reconstituted state.

2. The method of claim 1 wherein the step of providing a substantially homogeneous mixture of popped popcorn and shredded cheese comprises the steps of:
   providing a substantially uniform substrate of popped popcorn;
   adding shredded cheese on top of and within the interstices of said popcorn substrate to form said mixture.

3. The method of claim 2 wherein the step of providing a substantially homogeneous mixture comprises repeating the steps of providing a substantially uniform substrate of popped popcorn and adding shredded cheese on top of and within the interstices of said popcorn substrate one or more times wherein each new substrate is provided on top of said previously formed substantially homogeneous mixture.

4. The method of claim 1 wherein the shredded cheese is in the form of substantially flat strands approximately two to three inches long, approximately 150 inch to 3/16 inch wide and approximately 0.060 inch thick.

5. The method of claim 3 wherein the shredded cheese is in the form of substantially flat strands approximately two to three inches long, approximately ⅛ inch to 3/16 inch wide and approximately 0.060 inch thick.

6. The method of claim 1 wherein said heating step is accomplished by use of an impinger oven.

7. The method of claim 6 wherein the temperature of said impinger oven is approximately 250° F.

8. The method of claim 1 wherein said freezing step is accomplished by use of a cryogenic $CO_2$ freeze tunnel.

9. The method of claim 8 wherein the temperature of said freeze-tunnel is approximately −50° F. to approximately −75° F.

10. The method of claim 1 wherein the popped popcorn is popped powdered cheese coated popcorn.

11. The method of claim 10 wherein the popped powdered cheese coated popcorn is popped powdered white cheddar cheese coated popcorn.

12. The method of claim 11 wherein the shredded cheese is white cheddar cheese.

13. The method of claim 1 further comprising the step of: fracturing said freeze-dried food product into substantially bite-sized pieces.

14. The method of claim 1 further comprising the step of: placing an ingredient selected from the group consisting of herbs, spices, fruits, vegetables, nuts, meat, seafood, sauces and mixtures thereof within said unlayered, substantially homogeneous mixture of popped popcorn and shredded cheese prior to the freezing step.

15. The method of claims 1, 2, 3, 4, 5, 6, 7, 8, 9, 10, 11, 12, 13 or 14 wherein the step of freeze-drying is carried out until said product contains no more than 3 weight percent moisture.

16. The method of claim 15 wherein the step of freeze-drying is carried out until said product contains no more than 1 weight percent moisture.

17. A method for producing a crunchy freeze-dried food product to be consumed in its non-reconstituted state comprising the steps of:
providing an unlayered, substantially homogeneous mixture of popped popcorn and shredded cheese wherein the substantially homogeneous mixture is obtained by providing a substantially uniform substrate of popped popcorn and adding shredded cheese in the form of substantially flat strands approximately two to three inches long, approximately 150 inch to 3/16 inches wide and approximately 0.060 inches thick on top of and within the interstices of said popcorn substrate to form a substantially homogeneous mixture, and repeating said steps of providing a popped popcorn substrate and adding shredded cheese one or more times, wherein each new substrate is provided on top of said previously-formed substantially homogeneous mixture;
heating said mixture in an impinger oven at approximately 250° F. to melt said shredded cheese;
cooling said heated mixture thereby forming a cohesive mixture of cheese and popped popcorn;
freezing said cohesive mixture in a cryogenic $CO_2$ freeze tunnel at approximately −50° F. to approximately −75° F. to form a frozen mixture;
freeze-drying said frozen mixture until said product contains no more than 1 weight percent moisture to provide a crunchy freeze-dried food product; and
fracturing said freeze-dried food product into substantially bite-sized pieces to be consumed in a non-reconstituted state.

18. A crunchy, freeze-dried food product to be consumed in its non-reconstituted state comprising an unlayered, substantially homogeneous freeze-dried cohesive mixture of popped popcorn and cheese wherein the cheese binds a plurality of kernels of popped popcorn to each other to form a cohesive mixture of cheese and popcorn.

19. The food product of claim 18 further comprising an ingredient selected from the group consisting of herbs, spices, fruits, vegetables, nuts, meat, seafood, sauces, and mixtures thereof.

20. The food product of claim 18 wherein the popped popcorn is popped powdered cheese coated popcorn.

21. The food product of claim 20 wherein the popped powdered cheese coated popcorn is popped powdered white cheddar cheese coated popcorn.

22. The food product of claim 21 wherein the cheese is white cheddar cheese.

23. The food product of claim 18 wherein the food product is in the form of substantially bite-sized pieces.

24. The food product of claims 18, 19, 20, 21, 22, or 23 wherein the entire product contains no more than 3 weight percent moisture.

25. The food product of claim 24 wherein the entire product contains no more than 1 weight percent moisture.

* * * * *

UNITED STATES PATENT AND TRADEMARK OFFICE
CERTIFICATE OF CORRECTION

PATENT NO. : 5,208,055
DATED : May 4, 1993
INVENTOR(S) : Frederic W. Plochman

It is certified that error appears in the above-indentified patent and that said Letters Patent is hereby corrected as shown below:

Column 6, line 37, delete "non-constituted" and insert therefor -- "non-reconstituted".

Column 6, line 39, delete ":".

Column 6, line 68, delete "150" and insert therefor --1/8 --.

Column 7, line 49, delete "150" and insert therefor -- 1/8--.

Signed and Sealed this

Eighth Day of February, 1994

Attest:

BRUCE LEHMAN

*Attesting Officer*  *Commissioner of Patents and Trademarks*